United States Patent
Kaneda et al.

(10) Patent No.: US 6,822,834 B2
(45) Date of Patent: Nov. 23, 2004

(54) TAPE CARTRIDGE HAVING A PLURALITY OF IDENTIFICATION OPENINGS

(75) Inventors: Hiroshi Kaneda, Tokyo (JP); Motohiko Shima, Tokyo (JP); Masatoshi Okamura, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/301,025

(22) Filed: Nov. 21, 2002

(65) Prior Publication Data

US 2003/0063413 A1 Apr. 3, 2003

Related U.S. Application Data

(63) Continuation of application No. 09/562,304, filed on May 1, 2000.

(30) Foreign Application Priority Data

Jun. 7, 1999 (JP) ............................................. 11-159192

(51) Int. Cl.[7] ............................. G11B 5/41; G11B 23/87
(52) U.S. Cl. ...................................................... 360/132
(58) Field of Search ........................... 360/132; 242/344

(56) References Cited

U.S. PATENT DOCUMENTS

| | | | | |
|---|---|---|---|---|
| 5,541,794 A | * | 7/1996 | Griffen et al. | ............... 360/128 |
| 5,638,239 A | * | 6/1997 | Ohgi | ............... 360/132 |
| 5,703,742 A | | 12/1997 | Thiessen et al. | ............... 360/132 |
| 5,791,578 A | * | 8/1998 | Kurokawa et al. | ............... 360/132 |
| 5,855,333 A | | 1/1999 | Kiso et al. | ............... 242/344 |
| 6,160,679 A | | 12/2000 | Maekawa et al. | ............... 360/132 |

FOREIGN PATENT DOCUMENTS

| | | | |
|---|---|---|---|
| EP | 0 312 106 | 10/1988 | |
| EP | 0 389 121 | 2/1990 | |
| EP | 0 557 571 A1 | 6/1992 | |
| EP | 0 594 438 A1 | 10/1993 | |
| EP | 1 052 642 A1 | 9/1999 | |
| JP | 09237482 A | * 9/1997 | ........... G11B/23/28 |
| WO | WO 93/21633 | 3/1993 | |
| WO | WO 97/02565 | 7/1996 | |
| WO | WO 00/19429 | 9/1999 | |

* cited by examiner

Primary Examiner—George J. Letscher
Assistant Examiner—C R Magee
(74) Attorney, Agent, or Firm—Drinker Biddle & Reath LLP

(57) ABSTRACT

A tape cartridge having an identification hole for the prevention of accidental removal of recorded information or for no erasing formed in a housing of the cartridge and an additional identification hole formed in the vicinity of the first hole for a different purpose, both of the holes being adapted to engage with a no-erasing member which opens or closes the same. The no-erasing member when incorporated in the cartridge is able to open or close the no-erasing identification hole depending on the position of the member itself while normally closing the different-purpose identification hole and, when not incorporated in the cartridge, it allows the different-purpose identification hole to remain open whereby the tape cartridge is identified to be a different one. The two identification holes may be united into one. The different-purpose identification hole may be a hole intended for the identification of a cleaning cartridge.

8 Claims, 4 Drawing Sheets

(a)

TAPE CARTRIDGE HAVING A PLURALITY OF IDENTIFICATION OPENINGS

CROSS REFERENCE TO RELATED APPLICATION

This application is a continuation of application Ser. No. 09/562,304, filed on May 1, 2000, which is incorporated herein by reference in its entirety.

BACKGROUND OF THE INVENTION

1. Field of the Invention

This invention relates to a tape cartridge for use with a magnetic recording-reproducing apparatus, having an identification hole for record defeating, or the prevention of accidental removal of recorded information, and an additional identification hole both of which are formed in the bottom wall of lower casing of the cartridge.

2. Prior Art

Japanese Utility Model Application Kokoku No. 6-17238 discloses a tape cartridge having a detection section which comprises a plurality of holes formed in a part of the bottom wall or surrounding wall of the cartridge housing to detect the type of tape to be contained and covers provided on the inner walls of the holes as connected with thin-wall ribs, so that one or more hole covers are punched out to keep a hole or holes open depending on the type of tape used. A recording-reproducing apparatus (hereinafter called a "recorder") detects the type of tape by whether or not its detection means can gain entrance into the hole or holes thus formed. Usually, adjacent to the detection section for the determination of tape type, a means for preventing accidental removal of recorded information (hereinafter called a "no-erasing" means) of an arrangement in which a no-erasing hole is closed by a closing plug which slides to open or close the hole, is provided.

Although the no-erasing hole is opened or closed with the no-erasing plug, any other identification hole or holes are formed by punching the identification section when the necessity arises. This means that the manufacturing process sometimes necessitates an additional step of punching an identification hole cover or covers in each cartridge housing and, when such is the case, burrs of punched holes and resulting scraps pose problems.

BRIEF SUMMARY OF THE INVENTION

According to the present invention, the tape cartridge has an identification hole for the prevention of accidental removal of recorded information or for no erasing formed in the cartridge housing and an additional identification section in the form of a hole formed in the vicinity of the first hole for a different purpose, both of the holes being adapted to engage with a no-erasing member which opens or closes the same, the no-erasing identification hole being not closed by said no-erasing member when the hole of the different-purpose identification section is opened. The different-purpose identification section is made an identification hole and is closed by the no-erasing member. When the additional identification hole is formed as an open through hole, the no-erasing member is not incorporated in the cartridge.

When the no-erasing member is incorporated in the cartridge, the identification holes are normally closed by the no-erasing member, indicating that the cartridge is one of a particular type. The cartridge is shifted between an erasable or recordable position and a no-erasing or record-defeating position by sliding the no-erasing member to open or close the no-erasing hole, making it possible for a detection member of a recorder to detect the shift. On the other hand, with a cartridge not using a no-erasing member so that an identification hole in the cartridge housing is an open through hole, another detector of a recorder detects and identifies the cartridge to be of a different type.

DESCRIPTION OF THE PREFERRED EMBODIMENTS

In the embodiments of the invention to be presented below, cases in which cartridge housings of the same construction are used in the manufacture of magnetic tape cartridges holding magnetic tape each and also in the manufacture of recorder cleaning cartridges holding cleaning tape each will be explained. However, it should be obvious to those skilled in the art that cartridge housings of the same construction according to the invention may as well be utilized in making magnetic tape cassettes or cartridges of varying types.

First Embodiment

Figure 1A:
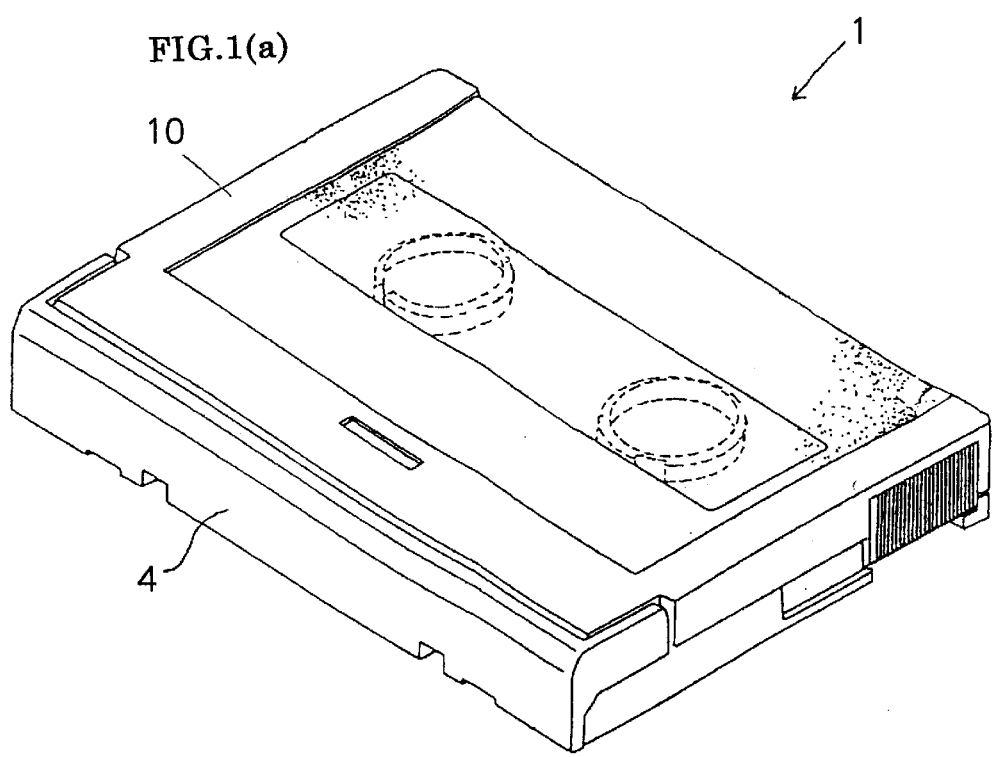
FIG. 1(a) being an upper part view and FIG. 1(b) a lower part view.
Figure 1B:
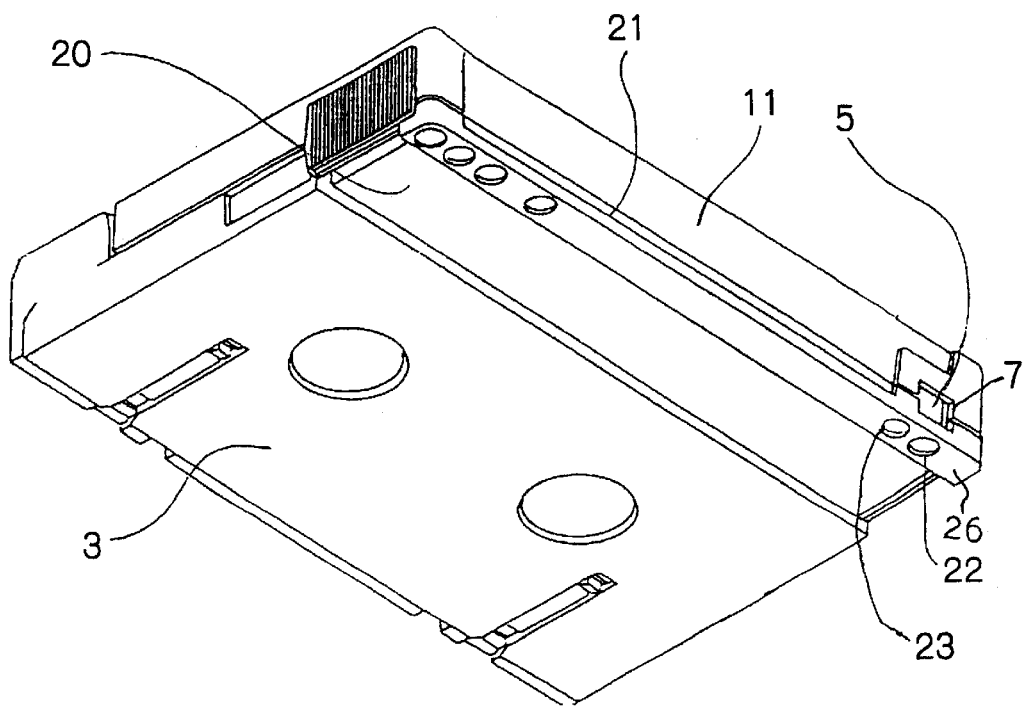
FIG. 1 shows a cartridge as a first embodiment of the invention in perspective.

FIGS. 1 to 4 illustrate a tape cartridge as the first embodiment of the invention, FIG. 1 showing it in perspective. FIG. 1(a) is a perspective view of the top half and FIG. 1(b) is a perspective view of the bottom half.

The tape cartridge 1 includes a housing composed of an upper and a lower casings 10, 20. When the cartridge is not in use, a front lid 4 and a slider 3 shut a cutout 27, a frontal space for tape loading (FIG. 2), thus protecting the tape portion inside the space against exposure to the outside.

FIG. 1(b) is a perspective view of the tape cartridge as seen from the back side.

Tape cartridge 1 is provided with a no-erasing member 5 for protecting recorded material from being removed accidentally.

A window 7 through which no-erasing member 5 is handled is formed in the joint between rear walls 11, 21 of upper and lower casings 10, 20. Through window 7 can a tiny knob 51 (to be explained later with reference to FIGS. 3 and 4) for operating no-erasing member 5 be handled.

Figure 2:
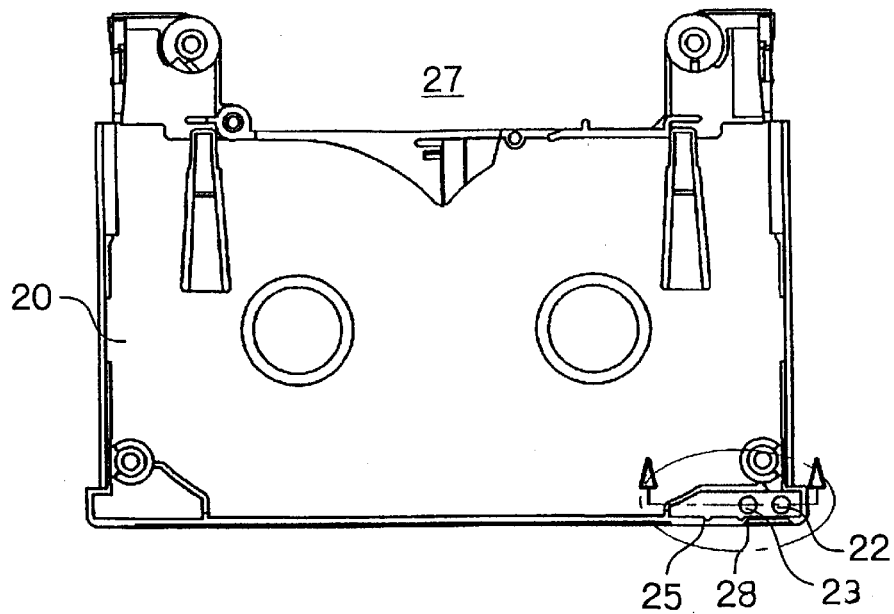
FIG. 2 is a plan view of a lower casing.

FIG. 2 is a plan view of lower casing 20, showing an identification hole 22 formed in the portion of bottom wall 26 where no-erasing member 5 is located.

Figure 3:
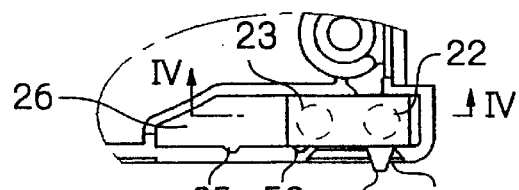
FIG. 3 is a fragmentary enlarged view of essential parts in FIG. 2, showing a no-erasing member set in place.

FIG. 3 is a fragmentary enlarged view of an essential region in which no-erasing member 5 is located. It shows identification hole 22 closed by no-erasing member 5 (where recording is made possible). Sliding no-erasing member 5 to the left sets it to no-erasing position (record defeat position) where identification hole 22 is left open.

Adjacent to identification hole 22 in the bottom wall 26 of lower casing 20, there is formed another identification hole 23 for a different purpose. The latter hole 23 is intended, for example, for the identification of the cartridge as one for cleaning a recorder. When identification hole 23 is closed by no-erasing member 5, the cartridge is not detected as one for cleaning use; when it is open, the cartridge is deemed a cleaning one.

As shown in FIG. 2, identification hole 23 is formed alongside identification hole 22 in the bottom wall 26 of lower casing 20. Walls surrounding identification holes 22, 23 are formed with faces for guiding no-erasing member 5 in its sliding movement to left and right. There are also formed two recesses 28, 25 for setting no-erasing member 5 in its erasing position at the right or no-erasing position at the left. As FIG. 3 indicates, either recess 28 or 25 can engage with an engaging protuberance 52 of no-erasing member 5. No-erasing member 5 further has a tiny knob 51 for its handling protruding through window 7.

Figure 4A:
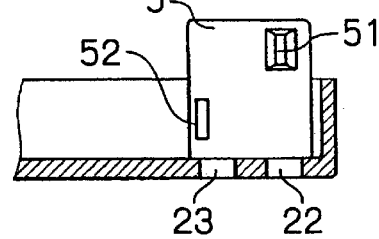
FIG. 4 shows fragmentary sectional views taken on the line IV—IV of FIG. 3, (a) indicating no-erasing member in a given position, (b) in another position, and (c) not incorporated in the cassette.
Figure 4B:
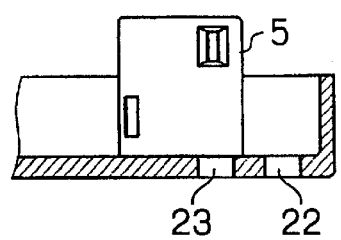
Figure 4C:
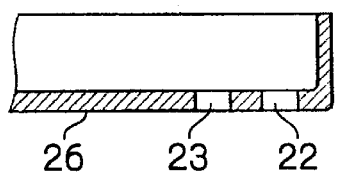

FIG. 4 is a sectional view taken on the line with arrows across identification holes 22, 23 in FIG. 2, FIG. 4(a) showing no-erasing member 5 in its erasing position and FIG. 4(b) in no-erasing position. FIG. 4(c) shows the case in which no-erasing member 5 is not set in either position. As will be clear from these views, identification hole 22 is opened or closed as no-erasing member 5 moves, but identification hole 23 (for the identification of a cleaning cartridge) remains normally closed. It is when identification hole 23 is set open that a cleaning cartridge is identified. Thus, a cartridge equipped with no-erasing member 5, wherever position it may be set to, is not identified as a cleaning one. Ordinarily a cleaning cartridge need not be fitted with no-erasing member, as in FIG. 4(c). Although identification hole 22 then remains open, it causes no problem because a cleaning cartridge is designed for playback only, not for recording.

Second Embodiment

Figure 5:
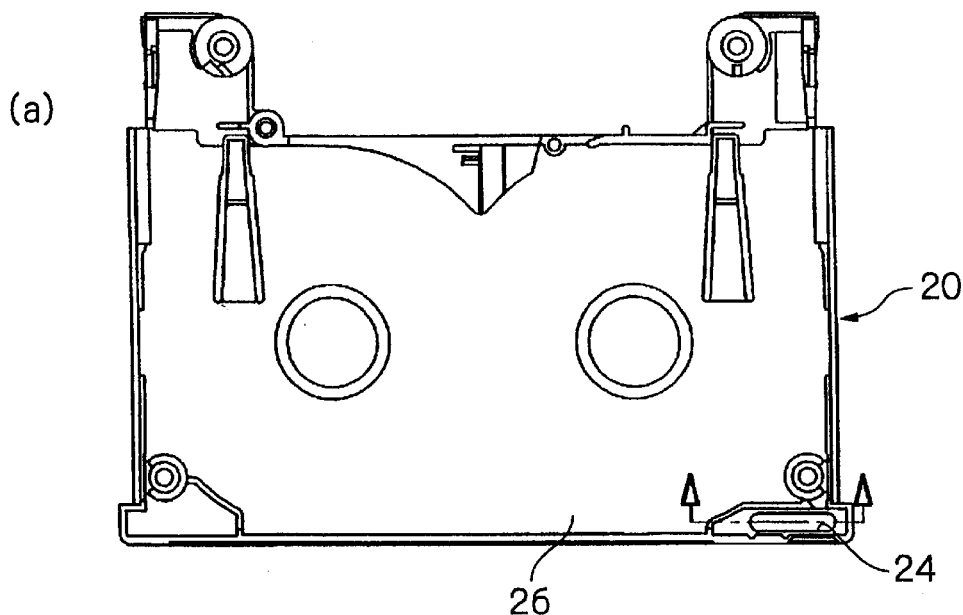
FIG. 5 is a plan view of a lower casing of a second casing.
Figure 6:
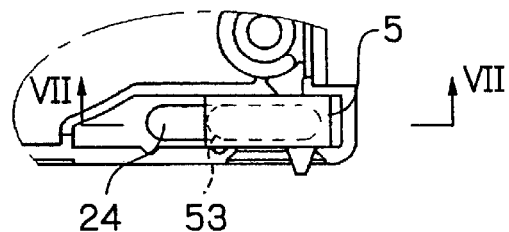
FIG. 6 is a fragmentary enlarged view of essential parts of FIG. 5, showing a no-erasing member set in place.
Figure 7A:
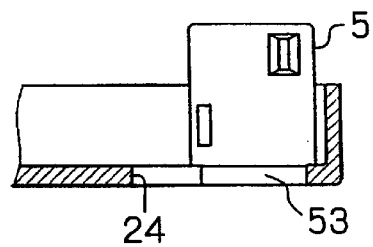
FIG. 7 shows fragmentary sectional views taken on the line VII—VII of FIG. 6, (a) indicating no-erasing member in a given position, (b) in another position, and (c) not incorporated in the cassette.
Figure 7B:
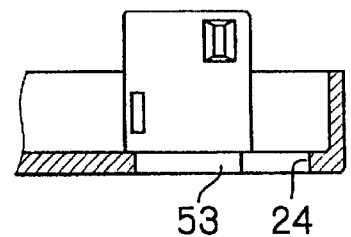
Figure 7C:
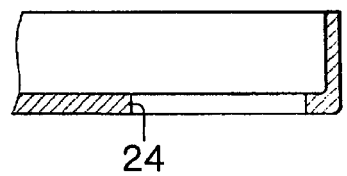

FIGS. 5 to 7 illustrate a second embodiment of the invention. The first embodiment enables a detector on a recorder to avoid accidental erasure of recorded information and identify the type of cartridge by seeing whether the inner surface of the bottom wall 26 of lower casing 20 has a wall which defines identification holes or not. This second embodiment is effective when the identification hole detection is carried out from the outside of the bottom wall 26 of lower casing.

In order to detect in the vicinity of the outer surface of the bottom wall 26 of lower casing 20, it is only necessary to unite the two holes 22, 23 of the first embodiment and elongate the united hole into a slot 24 and form a downward extension or shoe 53 on the bottom surface of no-erasing member 5, in such manner that shoe 53 can move to left and right in sliding contact with the parallel side walls of slot 24. The remainder of parts is the same as that of the first embodiment, and explanation is omitted.

In this embodiment a no-erasing member 5 alone can open or close the portion corresponding to two identification holes 22, 23, even though the detection point is in the vicinity of the outer surface of lower casing 20.

Third Embodiment

Figure 8:
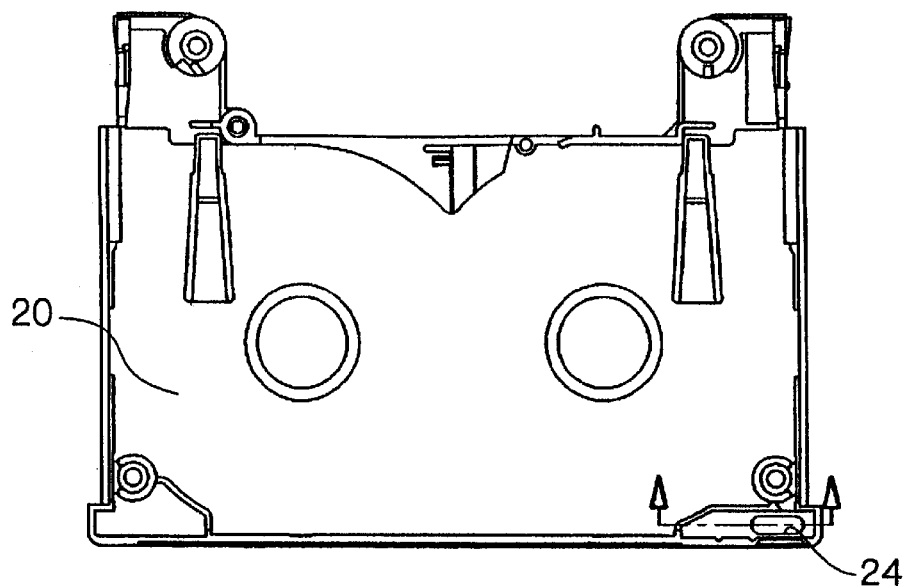
FIG. 8 is a plan view of a lower casing of a third embodiment.
Figure 9:
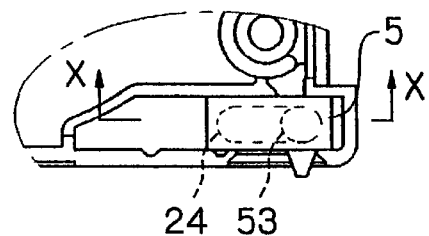
FIG. 9 is a fragmentary enlarged view of essential parts of FIG. 8, showing a no-erasing member set in place.
Figure 10A:
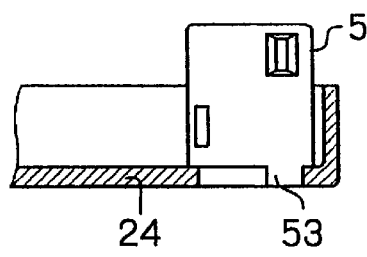
FIG. 10 shows fragmentary sectional views taken on the line X—X of FIG. 9, (a) indicating no-erasing member in a given position, (b) in another position, and (c) not incorporated in the cassette.
Figure 10B:
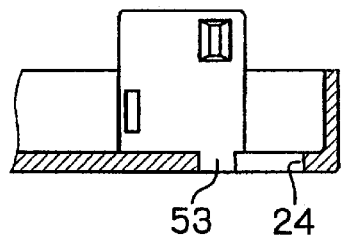
Figure 10C:
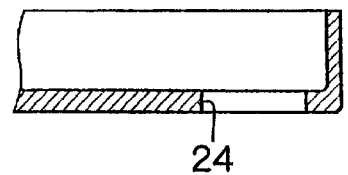

FIGS. 8 to 10 show a third embodiment. The embodiment is intended for the case in which a detection member of a recorder is located differently from the second embodiment. In the second embodiment slot 24 must be long enough to cover the sliding range of shoe 53.

In the third embodiment, by contrast, slot 24 has a length just connecting the two identification holes 22, 23 of the first embodiment, and a downward extension or shoe 53 of no-erasing member 5 slides to and fro between the two points within slot 24.

The arrangement may be so designed that the detection of no erasing is done in the vicinity of the outer surface of the bottom wall 26 of lower casing 20 and the detection of a cleaning cartridge is done in the vicinity of the inner surface of the bottom wall. When no-erasing member 5 is in the non-erasing position, the shoe 53 of no-erasing member 5 in cleaning-cartridge identification hole 23 comes near the outer surface of bottom wall of lower casing 20. The arrangement must, therefore, be also such that the recorder at that point determines that the particular identification hole is closed. This arrangement again offers the advantage of using the same cartridge housings for different kinds of cartridges simply by whether incorporating a no-erasing member or not.

Since another identification point near an identification hole for preventing accidental erasure of recorded information is kept as a hole which is normally closed by a no-erasing member, there is no necessity of punching an identification portion in the cartridge. Nor is the need of a punching operation when a separate identification portion should be a hole. Thus there is no possibility of scrap formation upon punching. When the additional identification hole becomes an open through hole, the no-erasing member is removed.

What is claimed is:

1. A tape cartridge comprising:
a first identification hole;
an additional identification hole formed in the vicinity of the first identification hole; and
a removable member that opens or closes the first hole and closes the additional identification hole;
wherein said removable member, when incorporated in the cartridge, is movable between a first position in which said removable member closes said first identification hole and said additional identification hole to allow recording and a second position in which said removable member opens said first identification hole and closes said additional identification hole to prevent recording, and the closure of the additional identification hold identifies the cartridge for a first purpose; and
wherein, when said removable member is not incorporated in the cartridge, said first and additional identification holes are open to identify the cartridge for a different purpose.

2. The tape cartridge of claim 1, wherein said first and additional identification holes are constituted by respective parts of a single hole.

3. The tape cartridge of claim 1, wherein the additional identification hole is a hole intended for the identification of a cleaning cartridge.

4. The tape cartridge of claim 2, wherein the additional identification hole is a hole intended for the identification of a cleaning cartridge.

5. A tape cartridge comprising:
- a first identification hole for the prevention of accidental removal of recorded information or for no erasing formed in a housing of the cartridge;
- an additional identification hole formed in the vicinity of the first hole for a different purpose; and
- a no erasing member adapted to be incorporated in the cartridge;
- wherein said no-erasing members when incorporated in the cartridge, is movable between a first position in which said no erasing member closes said first identification hole and the additional identification to allow recording or erasing and a second position in which said no erasing member opens the first identification hole and closes the additional identification hole to prevent the removal or the erasing and wherein said no erasing member, when incorporated in the cartridge, always closes the additional identification hole to identify the cartridge to be for a first purpose, and when said no erasing member is not incorporated in the cartridge, the open first and additional identification holes identify the cartridge to be for a different purpose.

6. The tape cartridge of claim 5, wherein the first and additional identification holes are united into one.

7. The tape cartridge of claim 5, wherein the additional identification hole is a hole intended for the identification of a cleaning cartridge.

8. The tape cartridge of claim 6, wherein the additional identification hole is a hole intended for the identification of a cleaning cartridge.

* * * * *